United States Patent
Bai et al.

(10) Patent No.: US 7,683,341 B2
(45) Date of Patent: Mar. 23, 2010

(54) USING LARGE FIELD-OF-VIEW DATA TO IMPROVE SMALL FIELD-OF-VIEW IMAGING

(75) Inventors: Chuanyong Bai, Poway, CA (US); Richard Conwell, Del Mar, CA (US)

(73) Assignee: Digirad Corporation, Poway, CA (US)

( * ) Notice: Subject to any disclaimer, the term of this patent is extended or adjusted under 35 U.S.C. 154(b) by 88 days.

(21) Appl. No.: 11/935,863

(22) Filed: Nov. 6, 2007

(65) Prior Publication Data

US 2008/0128633 A1 Jun. 5, 2008

Related U.S. Application Data

(60) Provisional application No. 60/864,565, filed on Nov. 6, 2006.

(51) Int. Cl.
*G01J 1/42* (2006.01)
(52) U.S. Cl. .................................................. 250/393
(58) Field of Classification Search ................. 250/393, 250/370.01–370.15, 363.01–363.1; 378/98.8
See application file for complete search history.

(56) References Cited

U.S. PATENT DOCUMENTS 6,339,223 B1 * 1/2002 Motomura et al. ..... 250/363.07

OTHER PUBLICATIONS

Bai et al., "Attenuation correction for cardiac SPECT imaging using small field-of-view detectors", Oct. 23-29, 2005, Nuclear Science Symposium Conference Record, 2005 IEEE. vol. 4, pp. 2112-2116.*
Chen et al., "Transmission scan truncation with small-field-of-view dedicated cardiac SPECT systems: Impact and automated quality control," Sep.-Oct. 2005, Journal of Nuclear Cardiology, vol. 12, pp. 567-573.*

* cited by examiner

*Primary Examiner*—David P Porta
*Assistant Examiner*—Kiho Kim
(74) *Attorney, Agent, or Firm*—Law Ofc SC Harris

(57) ABSTRACT

A large field of view projection image is obtained and a small field of view projection image is obtained. The two images are normalized, to take into account the difference between the count data between the images, and the way the images represent data. The large field of view image does not include truncation errors that are present in the small field of view image and therefore is stitched together with the smaller field of view image to use the improved data within the small field of view image with the truncation reduction enabled by the larger field of view image.

17 Claims, 2 Drawing Sheets

2

USING LARGE FIELD-OF-VIEW DATA TO IMPROVE SMALL FIELD-OF-VIEW IMAGING

This application claims priority from Provisional application No. 60/864,565, filed Nov. 6, 2006, the disclosure of which is herewith incorporated by reference.

BACKGROUND

Small field-of-view imaging may be used to image small objects and/or an organ-of-interests within larger objects. When used to image an organ of interest, the data in the regions of the image other than the organ of interest regions can be truncated. This operation can introduce truncation artifacts into the images. These truncation artifacts are caused by parts of the object and/or the image being truncated on some of the projection images.

Artifacts may result during the reconstruction of the projection images into a three-dimensional tomography image, since these parts of the object are in some projection images, but not others. This can in turn limit the quantitative accuracy of the image of the organ of interest.

In cardiac SPECT, using small field of view systems has certain advantages over using large field of view systems. Imaging using small field of view systems may truncate the organ-of-interest (the patient's heart in cardiac SPECT), and also may truncate other regions. This truncation can introduce a truncation artifact into the image set, and can also limit the quantitative accuracy of the images.

For example, if the emission field of view is too small, even though one can use a truncation-free attenuation map for attenuation correction, often one cannot get quantitatively accurate attenuation corrected images of the heart.

Techniques have been proposed to reduce the truncation artifacts. One technique suggests modifying the back projection. This may be used in iterative reconstruction algorithms. In this technique, regions of the image corresponding to the truncation in the projection data are not updated for that particular angle.

A complex conjugate concept can be used with the assumption of the body symmetry for truncation compensation in transmission scans.

Data completion techniques can be used to estimate the data in the truncated regions.

These truncation compensation techniques may improve the quantitative accuracy of the images themselves as compared to the images without truncation compensation.

However, when the field of view is very small, none of these techniques may be effective.

For example, for SPECT imaging, the organ of interest may be the heart. The heart often cannot be imaged accurately using very small fields of views, such as 15.0 cm, using the prior art techniques.

DETAILED DESCRIPTION

Figure 1:
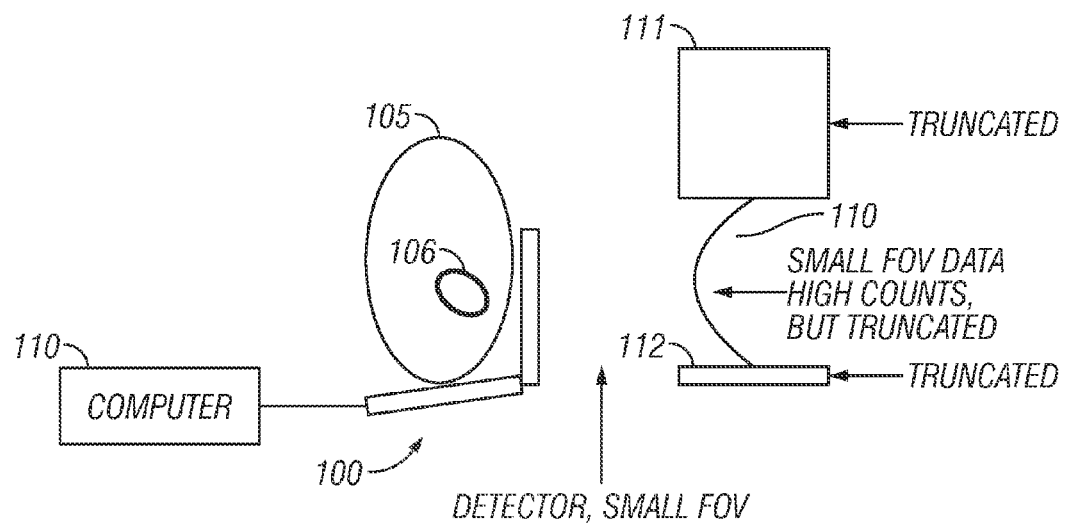
FIG. 1 shows a first part of the image acquisition, with data truncation using a small field of view dual-head system for cardiac SPECT.

An embodiment describes using single-photon emission computed tomography (SPECT) for cardiac imaging. However, the techniques described herein are intended to apply equally to other forms of medical imaging techniques.

An embodiment describes a technique that can improve small field of view imaging, using data from a large field of view image of the same object. The small field of view data is optimized for the imaging of the organ of interest. According to an embodiment, a high-count density is used to image the organ of interest in the small field of view detector. However, the small field of view data may have truncation artifacts from areas other than the organ of interest.

The large field of view data is acquired with a relatively low count density for the organ of interest, but covers the entire object in the larger field of view. Since a lower count density is used in this embodiment, the data acquisition takes less time than the small field of view data acquisition.

In the embodiment, the small field of view data has good resolution, but truncates some portions of the imaged area, and therefore has truncation errors. In contrast, the large field of view data of the same object is truncation free or at worst has very limited truncation. Based on noticing this, the inventors recognized that the large field of view data can be used to improve the small field of view imaging. This can be used both to reduce the truncation artifacts, and also to relax any quantitative limits set by the data truncation in the small field of view imaging.

An embodiment obtains both large field of view data and small field of view data from the same object, and preferably from the same or similar vantage points. The data from both the large field of view and small field of view images are combined. e,g, by data stitching. The large field of view data is used to reduce artifacts and distortion within the small field of view data. However, the superior resolution from the small field of view data is maintained.

In fact, unexpectedly, truncation artifacts are reduced more significantly by this system as the actual small field of view decreases. This is precisely the opposite of what is contemplated by the prior art.

This embodiment can be used for many different kinds of small field of view imaging where data truncation limits both the image quality and quantitative accuracy. Using cardiac SPECT as an example, when the small field of view is around 14.4 cm, the emission data is severely truncated. Truncation artifacts such as truncation rings and other aliasing effects, show in the reconstructed images. Even though the heart is not truncated in the data, the attenuated corrected images can be affected by these errors, and can be quantitatively inaccurate.

For example, the inventors' research showed that when truncation-free attenuation maps were used for attenuation correction, the final image of a uniform heart actually showed the septal wall was about 15% lower than the lateral wall when using a 14.4 cm field of view.

FIG. 1 shows a small field of view dual-head system 100 for cardiac SPECT imaging. Detector 100 acquires small field of view emission data of the patient 105 having an organ of interest 106, here the heart, with high count numbers, e.g., for a long acquisition time. The received data is highly truncated, and a reconstructed image could show truncation artifacts. FIG. 1 shows two different truncation locations at 111 and 112.

Also, the attenuation correction of the image of the heart can only reach a certain quantitative accuracy, even if a truncation free attenuation map is used for attenuation correction.

Figure 2:
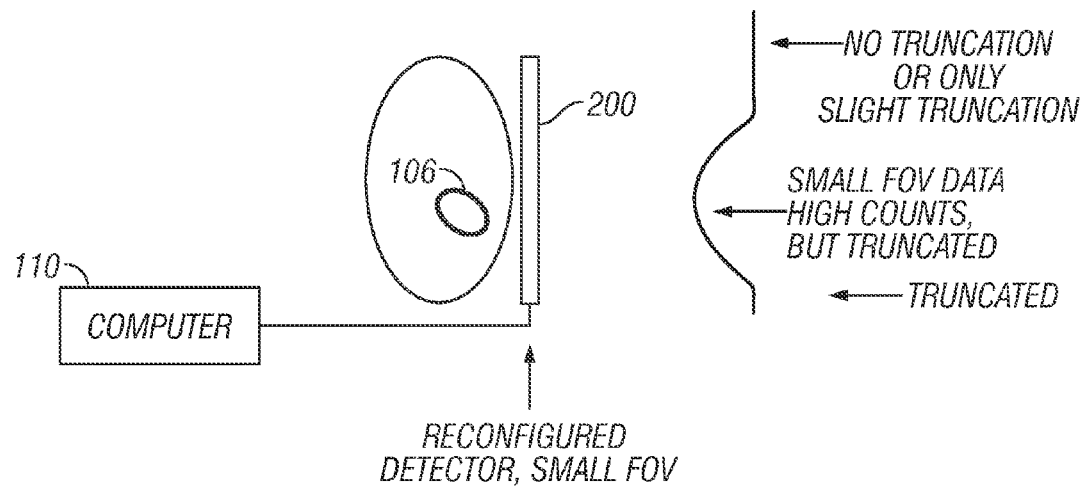
FIG. 2 shows a reconfiguration of the system in FIG. 1 to acquire larger field of view data with minimized truncation.

FIG. 2 illustrates obtaining a larger field of view data for the same organ 106. The dual-head system is reconfigured to a reconfigured arrangement 200, to obtain large field of view data. The large field of view data is acquired with a lower count number, e.g., a shorter acquisition time. The larger field of view has no truncation, or only slight truncation. The larger field of view data can be used in different ways to improve the image obtained from small field of view using the setup of FIG. 1.

Figure 3:
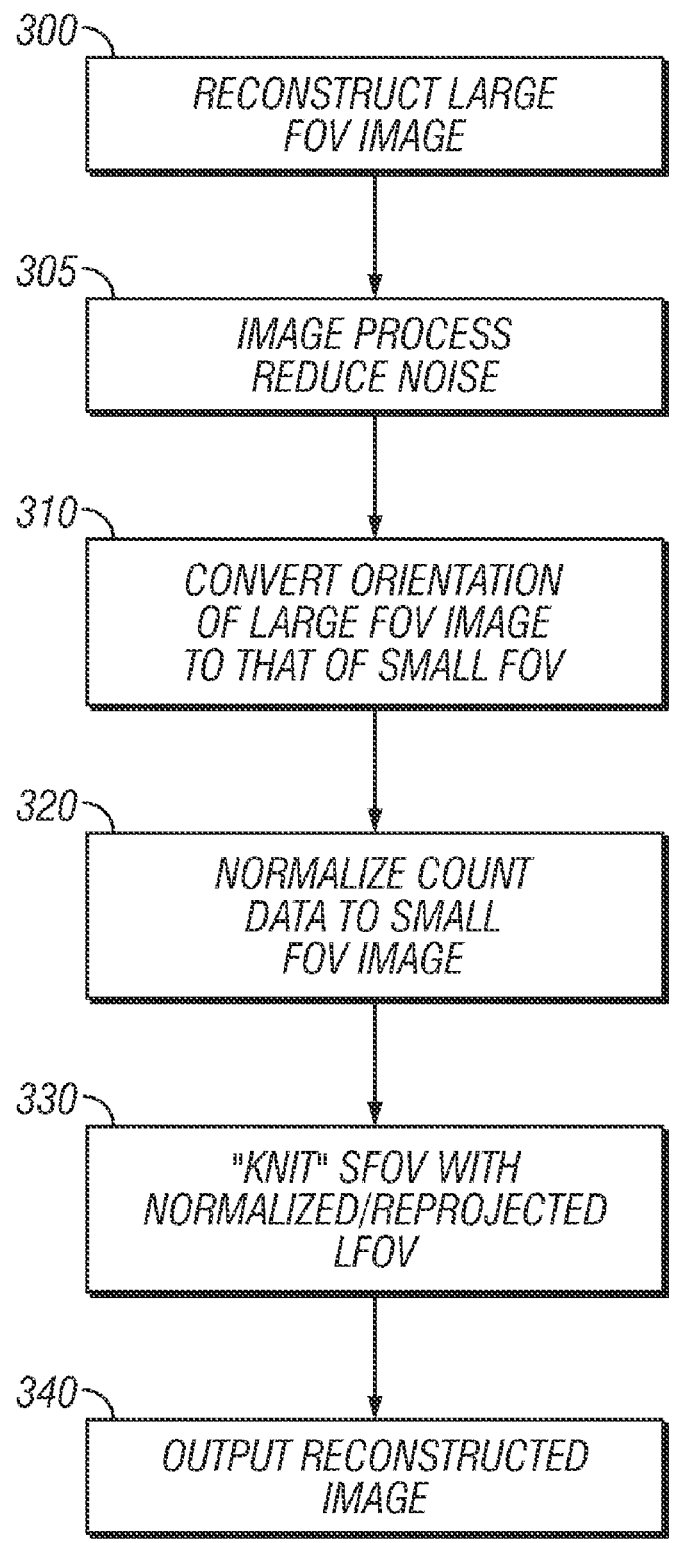
FIG. 3 shows a flowchart of operation of stitching together these images.

An embodiment obtains data from both the large field of view image and the small field of view image into computer 110. The data from the large field of view image is used to improve the small field of view image according to the flowchart of FIG. 3.

At 300, the image of the object 106 is reconstructed from the large field of view imager of FIG. 2. This image will have little or no truncation.

The image is then processed at 305 to suppress noise in the image.

At 310, the small field of view image from FIG. 1 is obtained, and its orientation and geometry is detected. The noise-adjusted large field of view image is adjusted to form projection data that has the acquisition geometry of FIG. 1. However, this reprojected image is actually a large field of view image even though it is in the geometry of the small field of view image. Therefore, the large field of view image is minimally, if at all, truncated.

At 320, the operation normalizes the reprojected data from the large field of view image to have the number of counts in the region corresponding to the non-truncated region in the small field of view image of FIG. 1.

At 330, the small field of view data in FIG. 1 is combined with the portion of the normalized reprojected data from 320 that corresponds to the truncated regions in the small field of view image, to obtain a knitted data image that has large field of view data. This can use any image knitting technique.

340 outputs a reconstructed image.

Since the data in 330 includes large field of view data, the truncation artifacts and quantitative accuracy limits set by data truncation in the small field of view imaging can be significantly reduced and relieved.

The large field of view can be achieved by reconfiguring the small field of view systems or any other means available such as a separate imager. In this embodiment, the large field of view data is acquired in a relatively short period of time, and much more acquisition time is used for small field of view data acquisition to acquire high count density data of the organ of interest. The noise in the large field of view data may propagate into the final image, which may affect the quality and quantitative accuracy of the image of the organ of interest.

In an embodiment, the best partition of the acquisition time between the large and small field of view data acquisition is determined to obtain the best quality and quantitative accuracy of the final image of the organ of interest. This invention also contemplates a trial and error approach to obtain and use the best acquisition partition of the large and small field of view acquisitions.

The above describes the large field of view image being reconfigured and reprojected, but it should be understood that the opposite can also occur, for example where the small field of view image could be reprojected and reconfigured to fill in and compensate within the large field of view image. It is believed, however, that modifying the small field of view image may produce less noise in the final image, since more acquisition time and detail are used to obtain the small field of view image.

The advantages of this system include that it allows obtaining the superior data that can be obtained from a small field of view image, without the associated disadvantages caused by the truncation error in such images. For example, the small field of view image may have more resolution and information, since it is imaging over a much more concentrated area. By using the large field of view image to compensate for the truncation errors, one obtains the advantages of the small field of view images, without its corresponding disadvantages.

Moreover, by setting the amount of acquisition time between the two acquired images, one is able to balance between the truncation reduction amount and the amount of resolution that one can obtain. For example, the small field of view image may be used to obtain five times as many counts as the large field of view image or 10 times as many counts thereof.

Another aspect includes a determining an optimum acquisition time between the large field of view image and the small field of view image, and determining which of the image acquisitions should receive which amount of time.

The general structure and techniques, and more specific embodiments which can be used to effect different ways of carrying out the more general goals are described herein.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, while the above describes a single unit which is reconfigured between large field of view and small field of view operation, it should be understood that two separate units could be used for this purpose. Moreover, other kinds of medical imaging systems could be used. Either the large field of view image, or the smaller field of view image, can be obtained first, since the order of obtaining the images makes no difference.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The computer may be an Intel (e.g., Pentium or Core 2 duo) or AMD based computer, running Windows XP or Linux, or may be a Macintosh computer. The computer may also be a handheld computer, such as a PDA, cellphone, or laptop.

The programs may be written in C or Python, or Java, Brew or any other programming language. The programs may be resident on a storage medium, e.g., magnetic or optical, e.g. the computer hard drive, a removable disk or media such as a memory stick or SD media, wired or wireless network based or Bluetooth based Network Attached Storage (NAS), or other removable medium or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

What is claimed is:

1. A method, comprising:
   first obtaining a first image of an organ of interest in a biological body, using a small field of view detector, said first image being from a first scan type and having at least one truncated portion;
   second obtaining a second image that includes said organ of interest in said biological body, said second image using a larger field of view detector than said small field of view detector and said second image also being from said first scan type so that said second image represents the same kind of information as said first image; and
   stitching together said first image and said second image to reduce an effect of said at least one truncated portions.

2. A method as in claim 1, wherein said first obtaining comprises obtaining said first image for a first number of counts, and said second obtaining obtains said second image for a second number of counts, wherein said second number of counts is less than said first number of counts.

3. A method as in claim 1, wherein said stitching comprises using portions of said second image to compensate for the truncated portion in said first image.

4. A method as in claim 3, wherein said stitching comprises re-projecting said second image to match said first image prior to said stitching.

5. A method as in claim 1, wherein said first obtaining is carried out prior to said second obtaining.

6. A method as in claim 1, wherein said second obtaining is carried out prior to said first obtaining.

7. A method, comprising:
   first obtaining a first image of an organ of interest in a biological body, using a small field of view detector, said first image having at least one truncated portion;
   second obtaining a second image that includes said organ of interest in said biological body, said second image using a larger field of view detector than said small field of view detector; and
   stitching together said first image and said second image to reduce an effect of said at least one truncated Portions, wherein said first image and said second image are both obtained by the same detector, and further comprising reconfiguring said detector between a large field of view configuration and a small field of view configuration.

8. A method, comprising:
   first obtaining a first image of an organ of interest in a biological body, using a small field of view detector, said first image having at least one truncated portion;
   second obtaining a second image that includes said organ of interest in said biological body, said second image using a larger field of view detector than said small field of view detector;
   stitching together said first image and said second image to reduce an effect of said at least one truncated portions, wherein said first obtaining comprises obtaining said first image for a first number of counts, and said second obtaining obtains said second image for a second number of counts, wherein said second number of counts is less than said first number of counts; and
   optimizing an amount of time used between obtaining said first image and said second image to minimize an amount of noise in said first image and said second image.

9. A method, comprising:
   first obtaining a first image of an organ of interest in a biological body, using a small field of view detector, said first image having at least one truncated portion;
   second obtaining a second image that includes said organ of interest in said biological body, said second image using a larger field of view detector than said small field of view detector; and
   stitching together said first image and said second image to reduce an effect of said at least one truncated portions
   wherein said stitching comprises using portions of said second image to compensate for the truncated portion in said first image,
   converting a configuration of said second image to match a configuration of said first image, and normalizing said second image to match at least one aspect of said first image, prior to said using portions of said second image to compensate for the truncation in the first image.

10. A method as in claim 9, wherein said normalizing comprises normalizing count data between said second image and said first image.

11. An apparatus, comprising:
    a medical detector, having a first configuration in which it detects a small field of view image which includes truncation therein, and a second configuration in which it detects a large field of view image which does not include any substantial truncation therein, said first image being from a first scan type and said second image also being from said first scan type so that said second image represents the same kind of information as said first image; and
    a computer, receiving information from said medical detector, including both said small field of view image and said large field of view image, and stitching together information from said small field of view image and from said large field of view image to compensate for said truncation in said small field of view image.

12. An apparatus as in claim 11, wherein said computer controls obtaining said small field of view image and said large field of view image, and controls said small field of view image to be obtained with higher count numbers then said large field of view image.

13. An apparatus as in claim 11, wherein said computer uses information from said large field of view image to compensate said small field of view image.

14. An apparatus as in claim 13, wherein said computer reprojects said large field of view image to match at least one aspect of said small field of view image.

15. An apparatus, comprising:
    a medical detector, having a first configuration in which it detects a small field of view image which includes truncation therein, and a second configuration in which it detects a large field of view image which does not include any substantial truncation therein;
    a computer, receiving information from said medical detector, including, both said small, field of view image and said large field of view image, and stitching together information from said small field of view image and from said large field of view image to compensate for said truncation in said small field of view image, wherein said computer uses information from said large field of view image to compensate said small field of view image,
    wherein said computer reprojects said large, field of view image to match at least one aspect of said small field of view image, wherein said computer reprojects by normalizing data within the image to take into account a count data between the large field of view image and the small field of view image.

16. A method as in claim 15, wherein said small field of view detector is reconfigured to forms said large field of view detector.

17. A method, comprising:
obtaining a first image of a medical object using a small field of view detector that images over a first field of view, said first image having truncation errors therein caused by said imaging using said first field of view;
obtaining a second image of said medical object using a large field of view detector that images over a second field of view, larger than said first field of view, and which has fewer truncation errors than said first image;
said first image being from a first scan type and said second image also being from said first scan type so that said second image represents the same kind of information as said first image;
re-projecting said second image in a way that makes it include similar information to the first image, said re-projecting forming a re-projected image; and
using the re-projected image to compensate for truncation errors in the first image.

* * * * *